United States Patent
Thakur et al.

(10) Patent No.: US 12,236,492 B2
(45) Date of Patent: *Feb. 25, 2025

(54) METHOD AND SYSTEM FOR PROCESSING TRANSACTIONS BASED ON TRANSACTION ARCHETYPES

(71) Applicant: INTUIT INC., Mountain View, CA (US)

(72) Inventors: Aveer Ratan Thakur, Mountain View, CA (US); Sameer Balasubrahmanyam, Santa Clara, CA (US); Dipesh Khakhkhar, Belmont, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,715

(22) Filed: Jul. 17, 2023

(65) Prior Publication Data

US 2023/0360145 A1  Nov. 9, 2023

Related U.S. Application Data

(63) Continuation of application No. 16/836,522, filed on Mar. 31, 2020, now Pat. No. 11,704,743.

(51) Int. Cl.
| | |
|---|---|
| *G06Q 40/12* | (2023.01) |
| *G06F 16/23* | (2019.01) |
| *G06Q 10/10* | (2023.01) |
| *G06Q 20/40* | (2012.01) |
| *G06Q 40/03* | (2023.01) |

(52) U.S. Cl.
CPC ......... *G06Q 40/12* (2013.12); *G06F 16/2379* (2019.01); *G06Q 10/10* (2013.01); *G06Q 20/405* (2013.01); *G06Q 40/03* (2023.01)

(58) Field of Classification Search
CPC ........ G06Q 40/12; G06Q 40/03; G06Q 10/10; G06Q 20/405; G06F 16/2379
See application file for complete search history.

(56) References Cited

U.S. PATENT DOCUMENTS

| | | | |
|---|---|---|---|
| 11,704,743 B2 * | 7/2023 | Thakur | G06Q 20/401 705/30 |
| 2007/0192254 A1 * | 8/2007 | Hinkle | G06Q 40/04 705/51 |
| 2010/0191930 A1 * | 7/2010 | Groff | G06F 8/44 711/170 |
| 2017/0295023 A1 * | 10/2017 | Madhavan | G06F 21/40 |

* cited by examiner

*Primary Examiner* — Paul Danneman
(74) *Attorney, Agent, or Firm* — Patterson + Sheridan, LLP

(57) ABSTRACT

Certain aspects of the present disclosure provide techniques for processing transactions in a computing system. An example method generally includes receiving a request to perform an operation with respect to an object included in the request. A system identifies an archetype defining properties of the object included in the request. Based on the identified archetype, the system identifies data repositories to commit data to in order to perform the requested operation and rules for performing the operation with respect to the object. One or more actions are executed against the identified data repositories according to the identified rules.

20 Claims, 7 Drawing Sheets

300 ⟶

```
archetypes:
    name: INCOME
        defaultCreditAccount: inventory
        defaultDebitAccount: cash
        forexConversion: spot
    name: INCOME-RECEIVABLE
        defaultCreditAccount: inventory
        defaultDebitAccount: accountsReceivable
        forexConversion: spot
    name: INCOME-PAYMENT
        defaultCreditAccount: accountsReceivable
        defaultDebitAccount: cash
        forexConversion: spot
    name: EXPENSE
        defaultCreditAccount: cash
        defaultDebitAccount: assets
        forexConversion: spot
    name: EXPENSE-PAYABLE
        defaultCreditAccount: accountsPayable
        defaultDebitAccount: assets
        forexConversion: spot
    name: EXPENSE-PAYMENT
        defaultCreditAccount: cash
        defaultDebitAccount: accountsPayable
        forexConversion: spot
```

310A ⟶

```
transaction:
    name: AssetPurchase
    amount: 1234.56
    archetype: EXPENSE
    forexConversion: trailing90dayavg
```

310B ⟶

```
transaction:
    name: Payroll
    amount: 1234.56
    archetype: EXPENSE
    debitAccount: hourlyPay
```

FIG. 3

METHOD AND SYSTEM FOR PROCESSING TRANSACTIONS BASED ON TRANSACTION ARCHETYPES

CROSS-REFERENCE TO RELATED APPLICATIONS

This application is a continuation of U.S. patent application Ser. No. 16/836,522, filed Mar. 31, 2020, entitled "Method and System for Processing Transactions Based on Transaction Archetypes," and assigned to the assignee hereof, the entire contents of which are hereby incorporated by reference.

INTRODUCTION

Aspects of the present disclosure generally relate to processing transactions in a computing system, and more specifically to processing transactions based on archetypes defining common properties of different types of transactions.

BACKGROUND

Many computing systems are used to maintain records of transactions related to a user of a computing system. These records may differ in content based on the data that is recorded for each transaction and the configuration of the transaction management system that records these transactions. For example, a security service may generate records when security events occur on a computing system, a general event monitoring system may generate records when particular events occur on a computing system, and an accounting system may generate records when particular transactions are generated in a commercial system.

Generally, formats of a transaction record and rules for processing and committing a transaction record to a data repository may be hard-coded into an application. When formats and rules for processing transactions are hard-coded, the logic for processing a transaction may be tightly coupled to the information defining the format and rules for committing each type of transaction record to the data repository, as well as logic for performing associated functions using the information included in a transaction. Thus, as new transaction types are added to an application, additional logic must be written to process those new types of transactions, and some of the logic may be duplicative of logic already written for existing transaction types in the application.

Thus, hard-coding the logic for processing transactions can negatively impact maintainability and extendibility aspects of the application. For example, because the logic for processing various transactions may be hard-coded in various locations, updating or modifying the application to add new capabilities for an existing type of transaction may be a time consuming task. Further, to add support for new types of transactions, new code needs to be written, tested, and integrated into the application. This new code may then be added in various locations in the code base of the application and may be duplicative of existing code, which may exacerbate maintainability issues arising from hard-coding processing logic into the application. Still further, new or modified code may need to be tested prior to deployment in a production environment. Because testing is generally a time-intensive process and may increase in complexity as the complexity of the processing logic under test increases, testing may delay the release of new features in the application.

Accordingly, techniques are needed to deploy code for processing transactions in a loosely coupled, efficiently maintainable manner.

BRIEF SUMMARY

Certain embodiments provide a computer-implemented method for processing transactions in a computing system. The method generally includes receiving a request to perform an operation with respect to a transaction object included in the request, wherein the transaction object references a transaction archetype. A definition of the referenced transaction is retrieved and parsed to identify default data repositories against which records for the transaction object are to be committed and default processing rules for values in the transaction object prior to committing the records for the transaction object to one or more data repositories. Overriding data repositories or overriding processing rules relative to data repositories or processing rules identified in the definition of the referenced transaction archetype are identified from a definition of the transaction object. The transaction object is processed using a default processing rule of the default processing rules when no overriding processing rule are defined for the default processing rule, or an overriding processing rule of the overriding processing rules when the overriding processing rule and conflicts with a corresponding default processing rule. Records are generated for the processed transaction object, and the generated records are written to the default data repositories when no overriding data repositories are defined, or the overriding data repositories when the overriding data repositories and the default data repositories conflict.

Other embodiments provide a system comprising a processor and a non-transitory computer-readable memory storing instructions that, when executed by the processor, perform an operation for processing transactions in a computing system. The operation generally includes receiving a request to perform an operation with respect to a transaction object included in the request, wherein the transaction object references a transaction archetype. A definition of the referenced transaction is retrieved and parsed to identify default data repositories against which records for the transaction object are to be committed and default processing rules for values in the transaction object prior to committing the records for the transaction object to one or more data repositories. Overriding data repositories or overriding processing rules relative to data repositories or processing rules identified in the definition of the referenced transaction archetype are identified from a definition of the transaction object. The transaction object is processed using a default processing rule of the default processing rules when no overriding processing rule are defined for the default processing rule, or an overriding processing rule of the overriding processing rules when the overriding processing rule and conflicts with a corresponding default processing rule. Records are generated for the processed transaction object, and the generated records are written to the default data repositories when no overriding data repositories are defined, or the overriding data repositories when the overriding data repositories and the default data repositories conflict.

Still further embodiments provide a computer-implemented method for processing transactions in a computing system. The method generally includes receiving a request to record a transaction in an electronic transaction ledger. A definition of the referenced transaction archetype is retrieved and parsed to identify a default debit record repository against which a debit record for the transaction is to be committed, a default credit record repository against which a credit record for the transaction is to be committed, and default rules for processing the transaction. One or more of an overriding credit record repository, an overriding debit record repository, or processing rules for processing the transaction are identified from a definition of a type of the transaction. The transaction is processed based on the processing rules for processing the transaction and default rules for processing the transaction that do not conflict with the identified default rules in the definition of the type of the transaction. A debit record and a credit record are generated based on the processed transaction. The debit record is written to the default debit record repository or the overriding debit record repository, where the overriding debit record repository is used when specified in the definition of the type of the transaction. The credit record is written to the default credit record repository or the overriding credit record repository, where the overriding credit record repository is used when specified in the definition of the type of the transaction.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 3 illustrates example archetype and transaction definitions.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
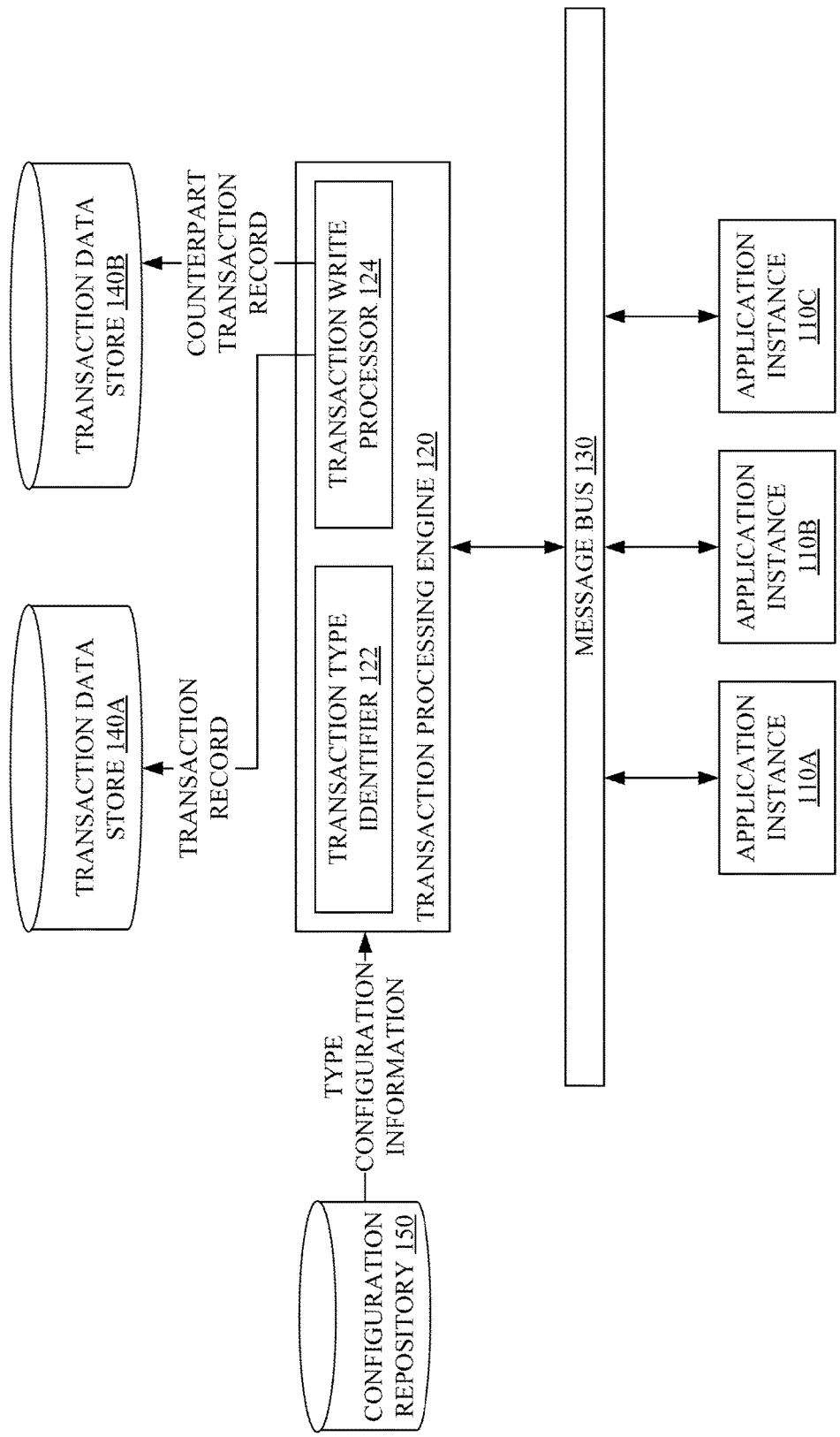
FIG. 1 illustrates an example computing environment in which a transaction processor processes transactions and commits transaction records to one or more data repositories based on transaction archetypes.

Aspects of the present disclosure provide systems, methods, and computer readable mediums for processing transactions in a computing system based on transaction archetypes.

Generally, transaction processing systems are configured to process transactions based on logic that is tightly coupled to the definition of a transaction. Generally, the definition of a transaction may include information that specifically defines how a transaction is to be processed, such as accounts or data repositories to which transaction records are to be persisted, rules for processing the transaction, and the like.

For example, in an accounting system, various types of transactions may be tightly coupled to logic that defines specifically the accounts to which entries are to be made (e.g., which account to credit and which account to debit in a double-entry-based accounting system). Because different types of transactions are defined with their own dedicated logic, maintaining an application to manage these transactions may be a time consuming task, as the logic for handling a specific transaction may be distributed across many locations in code and changes to the logic may affect other portions of the code. Further, because many different types of transactions may share common features and similar logic, the application may include a significant amount of re-used code, which may increase the potential for bugs or other code defects to be released in production versions of the application.

Embodiments presented herein improve the maintainability and robustness of transaction processing systems by defining transactions based on transaction archetypes. Requests to process a transaction may specify a transaction archetype that defines the default properties for the transaction, such as default rules for processing the transaction, default data repositories (e.g., account tables) to commit transaction records to, and the like. The request may further identify a transaction as a specific type of transaction with properties that override the default properties of the transaction to allow for customization without needing custom code to implement customization. Code for processing the transaction may, thus, use a single codebase for each transaction archetype that is loosely coupled to logic for processing specific types of transactions so that potentially duplicative code need not be maintained for processing different types of transactions independently. Thus, the amount of code implemented for processing transactions may be reduced, which may minimize the amount of persistent storage needed to host an application and the amount of memory used by each instance of the application. Further, the maintainability of the code for processing these transactions may be increased, as updates to add features or modify existing features may be made to a single location (e.g., module, class definition, etc.) rather than to duplicated code across various locations in the code base of an application. By localizing code for processing a transaction, a computing system may be made more robust, for example, by minimizing inconsistencies in code deployed to process a transaction, and inconsistencies in the actions performed in a computing system with respect to a transaction. Further, localizing code for processing a transaction to a single location may prevent new or updated code from adversely affecting the processing of other transactions in the computing system.

Example Transaction Processing Based on Transaction Archetypes

FIG. 1 illustrates a computing environment 100 in which transactions are processed, and records of such transactions are committed to one or more data repositories, based on transaction archetypes defined for an application. As illustrated, computing environment 100 includes a plurality of application instances 110, a transaction processing engine 120, a message bus 130 connecting the plurality of application instances 110 and the transaction processing engine 120, a plurality of transaction data stores 140, and a configuration repository 150.

Application instances 110 are generally representative of copies of an application executing on one or more computing devices (e.g., servers, server farms, cloud computing platforms, etc.). Each application instance 110 may be associated with a session of an application serving a particular user of the application. Generally, a user can initiate a request to record a transaction in transaction data stores 140 through an application instance 110 associated with the user's session. A request to record a transaction may include, for example, information defining a transaction object to be processed and, in some embodiments, additional information defining overrides to default parameters for processing the transaction object. The information defining a transaction object to be processed may reference a transaction archetype applicable to the transaction object to be processed, either explicitly in the request or in a definition of the type of the transaction object in application instances 110. A transaction object may specify a type of transaction to be processed by transaction processing engine 120, and, as discussed in further detail below, the type of transaction may identify a transaction archetype defining the default parameters for processing the transaction object.

In some embodiments, application instance 110 can transmit the request synchronously to transaction processing engine 120 using one or more application programming interface (API) calls exposed by the transaction processing engine 120. Generally, if application instance 110 transmits the request synchronously, transaction processing engine 120 may process the request and commit transaction records to the appropriate transaction data stores 140 upon receiving the request from the application instance 110. In some embodiments, application instance 110 can transmit the request to transaction processing engine 120 by placing the request on a message bus 130 connecting application instances 110 and transaction processing engine 120 for asynchronous processing. Transaction processing engine 120 can receive the requests placed on message bus 130 and process the requests independently of when the requests are placed on the message bus by the application instances 110.

Transaction processing engine 120 generally receives requests to process a transaction (e.g., synchronously from an application instance 110 or asynchronously through a message bus 130) and processes the transactions based on the default properties defined for the identified archetype of the transaction object specified in the request and any overrides to the default properties. As illustrated, transaction processing engine 120 includes a transaction type identifier 122 and a transaction write processor 124.

Transaction type identifier 122 generally examines the transaction object included in a request to record a transaction to identify an archetype for the transaction object included in the request and default parameters for processing the request based on the identified archetype. The default parameters may be defined in an archetype definition used by transaction processing engine 120 to process transaction objects that reference a specified archetype in the archetype definition.

Generally, an archetype may represent an abstract type that represents a group of workflows that share a common set of attributes. For example, in an accounting system, transaction archetypes may be defined for classes of workflows that share credit and debit properties. In an accounting system, transaction archetypes may be defined for different income and expense workflows based on whether transactions are handled on a cash basis or an accrual basis. Cash basis workflows, for example, may be associated with transaction archetypes that record transactions against a cash account and corresponding transactions against asset accounts; meanwhile, accrual basis workflows may be associated with transaction archetypes that record income against receivable accounts and record expenses against payable accounts. Each archetype (i.e., for a specific class of transactions, such as cash basis income, cash basis expenses, accrual basis income, and accrual basis expenses) may be associated with default repositories in which transaction records are to be stored and other default pre-processing operations to perform prior to committing the transaction records to the default repositories. Specific types of transactions that reference an archetype may override these default repositories and/or default pre-processing operations, as discussed in further detail below.

For example, an income archetype may be defined such that a first transaction record is committed to a data repository associated with inventory balances and a corresponding second transaction record is committed to a data repository associated with cash balances. Likewise, an expense archetype may be defined such that a first transaction record is committed to a data repository associated with cash balances and a corresponding second transaction record is committed to a data repository associated with asset balances.

As discussed, a transaction object may reference an archetype to broadly define the features of the transaction object. The transaction object may further include one or more labels, which may be user-defined labels within an application, that identify the type of the transaction object in more granular detail. For example, the labels may identify transactions as a specific type of expense (e.g., inventory, payroll, operating expenses, etc.) or a specific type of income (e.g., from sales of goods, asset sales, tax refunds, etc.). In some embodiments, the labels may be used to allow users of the application to search for particular types of transactions in the transaction data stores 140.

To identify the archetype for the transaction object, transaction type identifier 122 can retrieve, type configuration information from configuration repository 150 for the type of the transaction object. The type configuration information for transaction archetypes and any transaction objects referencing a transaction archetype may be formatted in a variety of markup language formats, such as eXtensible Markup Language (XML), Javascript Object Notation (JSON), or the like, and may identify the archetype for the type of the transaction object and default parameters for the transaction object that may override default parameters for the identified archetype. Based on the identified archetype, transaction type identifier 122 can retrieve the type configuration information associated with the identified archetype from configuration repository 150 to identify the default repositories to write the transaction object to and operations to perform on the transaction object prior to writing the transaction object to the default repositories.

Transaction write processor 124 uses the transaction archetype information identified by transaction type identifier 122 to process the transaction object and generate one or more write requests to be executed against transaction data stores 140. Prior to generating the one or more write requests, transaction write processor 124 can use preprocessing rules associated with the identified transaction archetype to perform one or more operations on the values included in the transaction object.

For example, in an accounting system, transaction write processor 124 may use the preprocessing rules to perform actions such as currency conversion, selection of items against which transactions are to be performed against (e.g., to support first in, first out (FIFO) accounting for sales transactions), and the like.

To determine whether one or more preprocessing transactions are to be performed prior to generating write requests to commit transaction records to the transaction data stores 140, transaction write processor 124 can use the rules identified by the archetype to determine if data included in the transaction object is to be processed.

For example, a rule in the archetype definition may specify that a currency conversion operation be performed if the transaction object includes information identifying a currency that the transaction was performed in and the identified currency is different from the currency in which records are maintained in transaction data store 140.

Transaction write processor may then obtain, from a remote source, a conversion rate between the currency specified in the archetype definition and the currency specified in the transaction object and convert the values in the transaction object to the currency specified in the archetype definition.

In some embodiments, additional rules may be associated with a label with which the transaction object is tagged. These rules may override the default rules included in or otherwise associated with the archetype definition or may add additional rules to those included in the archetype definition. Where rules associated with the label conflict with or otherwise override default rules included in or associated with the archetype definition, the transaction object may be processed according to the rules associated with the label rather than those associated with the archetype definition. In some embodiments, the transaction object may be processed according to the rules associated with the archetype and the rules associated with the label, where the rules associated with the label do not override or conflict with those associated with the archetype.

More generally, rules may be structured in a hierarchy, where rules associated with an archetype are generally applicable unless overridden by rules associated with a label applied to a transaction. Rules associated with a label applied to a transaction may be generally applicable to items in the transaction unless overridden by rules associated with a label applied to a line item in the transaction. For example, suppose an archetype Ai includes rules A, B, C, and D. Generally, any transaction referencing the archetype Ai may be processed according to rules A, B, C, and D. If, however, a transaction is labeled with a transaction type Ti having a schema defining a rule A' that overrides rule A in the archetype Ai, the transaction may be processed according to rules A', B, C, and D. Further, if the transaction type Ti has a schema defining an additional rule E, transactions labeled with the transaction type Ti may be further processed according to rule E; however, rule E will not apply to transactions that are not labeled with the transaction type Ti.

After transaction write processor 124 performs preprocessing operations on the transaction object included in the received request, transaction write processor 124 can generate one or more write requests to be executed against transaction data stores 140 to write a record of the transaction to the transaction data stores. Generally, in generating the one or more write requests, transaction write processor 124 can identify the data stores to which transaction records are to be written based on default repositories defined in the archetype identified by the transaction object, overrides in the request or in the transaction object, and information derived from the transaction object and the user account associated with the application instance 110 that generated the request.

In some embodiments, where the label is associated with an override to the default repositories and the request also does not include an override to the default repositories, transaction write processor 124 can generate write requests to perform against the default repositories identified in the archetype definition.

For example, in an accounting application, the archetype definition may identify a data repository 140 against which a debit transaction is to be performed and a data repository 140 against which the corresponding credit transaction is to be performed. Generally, based on the type of transaction associated with an archetype, a debit transaction record may be used to increase the value of an asset account or decrease the value of a liability account, and a corresponding credit transaction record may be used to decrease the value of a corresponding asset account or increase the value of a corresponding liability account.

For example, suppose that a transaction object is associated with an expense archetype, in which the value of an asset account is increased and the value of a cash account is decreased. Transaction write processor 124, based on the archetype definition, may generate a write request to commit a debit transaction record to a transaction data store associated with the user's asset account and a write request to commit a corresponding credit transaction record to a transaction data store associated with the user's cash account. The debit transaction may have a positive value, and the corresponding credit transaction may have a negative value so that the debit and credit transactions offset.

In another example, suppose the transaction object is associated with an income archetype in which the value of an asset account is decreased and the value of a cash account is increased. In this example, transaction write processor 124 generates a write request to commit a credit transaction record to a transaction data store associated with the user's asset account and a write request to commit a corresponding debit transaction record to a transaction data store associated with the user's cash account.

In some embodiments, where the label is associated with an override to the default repositories or an override is included in the request, transaction write processor 124 can generate write requests to the repositories identified in the label definition or the request. In some embodiments, transaction write processor 124 can analyze the label with which the transaction object is tagged to determine the transaction data stores 140 against which the write requests are to be executed. In such a case, a user may maintain multiple transaction data stores 140, with each transaction data store 140 being associated with a different account in the user's chart of accounts.

Generally, in processing transactions at transaction processor 120 using transaction archetypes and transaction objects referencing one of the transaction archetypes, a single code base may be implemented for each transaction archetype. Custom code need not be maintained for each specific type of transaction processed by transaction processor 120. Rather, the single code base for each transaction archetype can use information in definitions of the transaction archetype (e.g., schemas defining a transaction archetype) and the definitions of labels associated with a transaction or a specific item in a transaction object (e.g., schemas defining these labels) to process a transaction according to the default parameters in the definition of the transaction archetype and/or overrides in the definition of any labels associated with the transaction or the specific item in the transaction object. Rather than defining a parent object and child objects in code with override functions in each of the specific child objects, easily maintainable external schemas can be used to define how transactions are processed. Further, functionality may be added to transaction processor 120 using code based on the transaction archetypes and need not implement specific code for specific types of transaction objects, which may accelerate the testing and deployment of new features in a software application.

Generally, each transaction data store 140 may be associated with different types of transactions to allow a user to record transactions with a greater degree of granularity than would be obtained in a transaction processing system in which transactions are recorded in generalized expense and asset ledgers. For example, suppose a user maintains separate transaction data stores for payroll expenses, inventory expenses, other operating expenses, accrued payroll obligations, sales income, and a general cash ledger. To identify which transaction data stores to commit transaction records to, transaction write processor 124 can analyze the information included in a transaction data object to identify which account(s) in a user's chart of accounts are implicated by the transaction. The information may include, for example, counterparty information, a textual description included in the transaction, and other information that can be semantically analyzed to semantically determine the transaction data stores against which write requests are to be executed in order to record a transaction.

Suppose, for example, that a transaction object includes a description including words that are semantically related to payroll (e.g., "weekly pay", "monthly pay", or the like). A semantic analysis of the description included in the transaction object may, for example, calculate a relevance score, distance metric, or other metric indicating a similarity (e.g., a semantic closeness) between the description in the transaction object and names of each account in the user's chart of accounts. Transaction write processor 124 can select the accounts with the highest scores and write transaction records to the selected accounts.

In some embodiments, transaction write processor 124 may be configured to generate a plurality of transaction records based on the contents of the transaction object included in the received request. In such a case, a transaction object may include a plurality of items, with each item representing a separate transaction to be committed to the transaction data stores. Each item may be associated with a label, and transaction write processor 124 may generate transaction records for each item in the transaction object based on the label. Each item, thus, may be treated as its own transaction and may be processed using the techniques discussed above.

For example, suppose that a transaction object references an income archetype and includes a plurality of items associated with a sales label and an item associated with a discount label. Each of the plurality of items associated with the sales label may be recorded using sets of transaction records that decrease the value of an inventory account and increase the value of a cash account, and the item associated with the discount label may be recorded using a set of transaction records that decrease the value of the cash account and increase the value of an expense account.

In some embodiments, an application instance 110 can use the records committed to transaction data stores 140 by the transaction write processor to perform various reporting and calculation tasks.

For example, where an application instance is an accounting system, the application instance can use the records to generate profit/loss reports, tax reports, and other reports that may be generated from records of monetary transactions that have been previously recorded.

In some embodiments, the reports generated by the application instance 110 may be based on labels assigned to each transaction recorded in the transaction data stores 140.

For example, an application instance 110 may be configured to generate reports for a particular type of transaction (e.g., all sales transactions performed over a given time period, all payroll expenses incurred over a given time period, etc.). To do so, application instance 110 can query a transaction data store 140 for records associated with a particular type of transaction (e.g., records tagged with a particular label) and generate the report based on the records returned from the transaction data store 140.

Transaction data stores 140 are generally illustrative of different data repositories in which transaction records may be maintained. While FIG. 1 illustrates two transaction data stores in which transaction records are stored in transaction data store 140A and counterpart transaction records are stored in transaction data store 140B, it should be recognized that the computing environment may include any number of transaction data stores to which transaction records may be written. For example, a user may be associated with any number of transaction data stores, and these transaction data stores may be repositories for particular types of transaction records, as discussed above.

Configuration repository 150 generally stores the configuration information used by transaction processing engine 120 to process transactions, as discussed above. The configuration information, as discussed, may include information defining different transaction archetypes and information defining different types of transactions that inherit and/or override properties defined for a given transaction archetype. The configuration information may be stored as files in a variety of markup language formats and may be updated based on input generated by users of application instances 110 (e.g., to add new types of transactions, specify overrides to the default properties of a given transaction archetype, and the like).

Figure 2:
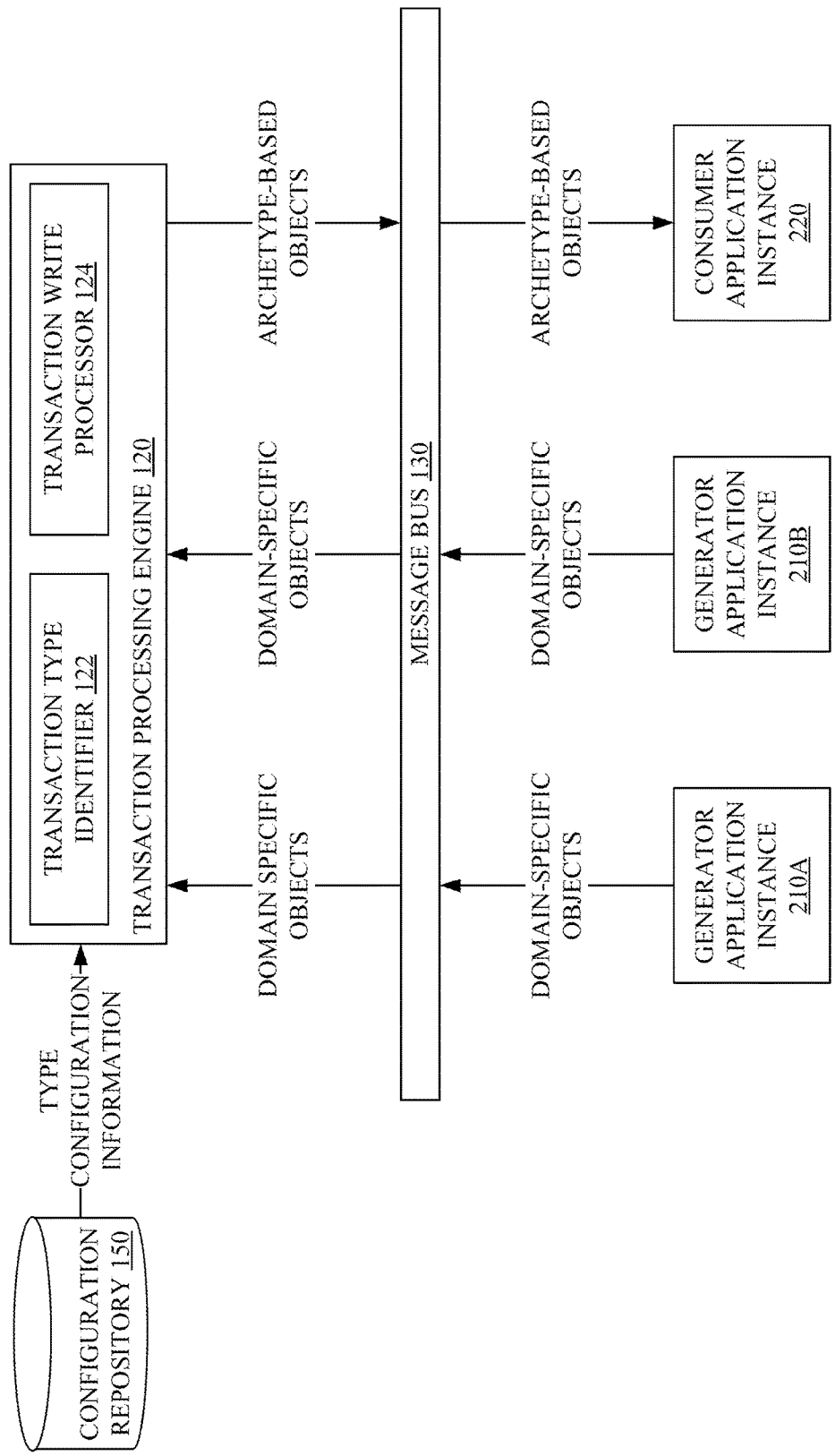
FIG. 2 illustrates an example computing environment in which a transaction processor processes domain-specific objects published by data generator applications into transaction archetype-based objects consumed by data consumer applications.

FIG. 2 illustrates an example computing environment 200 in which a transaction processor processes domain-specific objects published by data generator applications into transaction archetype-based objects consumed by data consumer applications.

As illustrated, computing environment 200 includes a plurality of generator application instances 210 and a consumer application instance 220 that publish and consume messages placed on a message bus 130. Generally, generator application instances 210 may generate various domain-specific objects and publish those domain-specific objects for processing by transaction processing engine 230. Transaction processing engine 230 in turn, as discussed in further detail below, can translate these domain-specific objects into transaction archetype-based objects that a consumer application instance 220 can consume irrespective of the specific generator application that generated the domain-specific objects from which these transaction archetype-based objects were generated.

Generator application instances 210A-210B generally represent specific applications that generate data objects according to a domain-specific definition. For example, in an accounting application, a generator application instance 210 may be a payroll application, an invoicing application, or the like. The data objects generated by each of generator application instances 210 may be generated according to object definitions maintained for a specific application instance. A payroll application may thus generate payroll objects in a format that is used internally for processing payroll events, while an invoicing application may generate invoice objects in a format that is used internally for processing invoices and is different from the payroll objects used by the payroll application. To record events generated by generator application instances 210A-210B generator application instances 210 can publish the generated domain-specific objects on message bus 130 with an indication that the generated domain-specific objects are intended for processing by transaction processing engine 230.

Generally, when transaction processing engine 120 consumes a message on message bus 130 including domain-specific objects published on message bus 130 by a generator application instance 210A-210B, transaction type identifier 122 generates archetype-based objects using information defining mappings between domain-specific objects and archetype-based objects that can be used by a consumer application instance 220. As new generator application instances are added to a system, new mappings may be established between the domain-specific objects used by the new generator application instances and the archetype-based objects used by the consumer application instance 220. By translating between domain-specific objects and archetype-based objects at transaction processing engine 120, a single code base may be maintained at the consumer application instance 220 for aggregating transaction information from each of the plurality of generator application instances 210A-210B regardless of the specific object definitions used internally by the generator application instances 210A-210B. As the definition of domain-specific objects change (e.g., to include new data fields, deprecate existing data fields, etc.), and as the generator application instances 210A-210B change to add or remove features, the translation code in transaction type identifier 122 may be modified accordingly so that domain-specific objects are still translated into archetype-based objects.

Transaction write processor 124 generally publishes the archetype-based objects generated by transaction type identifier 122 on message bus 130 for consumption. The archetype-based objects may be published on message bus 130 with an indication that the archetype-based objects are intended for consumption by the consumer application instance 220.

Consumer application instance 220 generally is an application that aggregates data from the generator application instances 210A-210B for analysis. Because generator application instances 210A-210B generate objects using a domain-specific object definitions, but consumer application 220 consumes archetype-based objects generated by transaction processing engine 230, consumer application instance 220 may maintain a single code base for processing objects generated by generator application instances 210A-210B (e.g., in transactions processed by these generator application instances) regardless of the specific details of the objects generated by generator application instances 210A-210B. For example, in the accounting system described above, the generator application instances 210A and 210B can generate various domain-specific objects, such as objects for payroll transactions, objects for invoice transactions, and the like. Based on mappings between these objects and archetype objects, these domain-specific objects may be handled at consumer application instance 220 as archetype-based objects corresponding to the class of transaction associated with these domain-specific objects. In this example, the payroll transactions may be translated into objects referencing an expense archetype, and the invoice transactions may be translated into objects referencing an income archetype. These archetype-based objects may be consumed by the consumer application instance 220 by reading one or more messages on message bus 130 identifying the consumer application instance 220 as the intended recipient. In this case, the consumer application instance can aggregate the archetype-based objects generate various reports based on the archetype-based objects. These reports may duplicate reports that can be generated by a specific generator application instance 210 or may be reports that aggregate and analyze data across the generator application instances 210A-210B (e.g., a total profit/loss statement generated from the payroll transactions and the income associated with the invoices transactions generated by the generator application instances 210A-210B).

Example Transaction Archetypes and Transaction Labels

FIG. 3 illustrates an example definition of transaction archetypes and types of transactions that reference a transaction archetype.

As illustrated, transaction archetype definition 300 includes a plurality of entries that each define different transaction archetypes, which, as discussed above, generally define default rules for a particular type of transaction. While transaction archetype definition 300 illustrates archetype definitions for transactions in an accounting system, it should be recognized that transaction archetypes may be defined for a variety of transactions for which records are maintained in a computing system (e.g., file operations in a file system, security-related transactions, etc.).

Transaction archetype definition 300 includes information defining three expense-related archetypes and three income-related archetypes. Each of these archetypes includes information defining a default account (and the corresponding default data repository) to commit offsetting transaction records to (i.e., a first account to commit a debit record to and a second account to commit a corresponding credit record to). For example, the INCOME archetype, which corresponds to an income transaction in a cash-basis accounting system, defines a default credit account as "assets" and a default debit account as "cash". That is, a system that processes a transaction having the INCOME archetype would, by default, generate a write request against the data repository associated with the "assets" account to write a credit transaction to the "assets" account and generate a write request against the data repository associated with the "cash" account to write a debit transaction to the "cash" account.

Likewise, the EXPENSE archetype, which corresponds to an expenditure in a cash-basis accounting system, defines a default credit account as "cash" and a default debit account as "assets". Thus, a system that processes a transaction having the EXPENSE archetype would, by default, generate a write request against the repository associated with the "cash" account to write a credit transaction to the "cash" account and generate a write request against the repository associated with the "assets" account to write a debit transaction to the "expense" account.

As illustrated, each of the archetypes in transaction archetype definition 300 is also associated with a default processing rule for handling transactions with foreign exchange matters. In each of these archetypes, the default rule generally identifies how transactions are processed when recorded in a currency other than a default currency (e.g., a currency defined by the user of an application as the currency in which transactions are performed). Specifically, the default rule specifies that foreign exchange conversions are converted to the default currency at "spot" rate.

Transaction objects 310A and 310B illustrate examples of transaction objects received in a request to write transactions to the appropriate data repositories. As illustrated, both transaction object 310A and 310B have a name (or label), which may be used to filter transactions stored in the transaction data stores 140, include an amount of the transaction, and reference the EXPENSE archetype. Transaction object 310A does not, however, include information identifying an override to the default parameters in the EXPENSE archetype. Thus, when a system receives a request to process a transaction including transaction object 310A, the system can generate the write requests against the default credit and debit accounts defined for the EXPENSE archetype. A credit transaction may be written to the "cash" account to reduce the balance in the "cash" account by the amount specified in transaction object 310A. A corresponding debit transaction may be written to the "assets" account to increase the balance in the "assets" account by the amount specified in transaction object 310A.

As illustrated, transaction object 310A includes information specifying an override to the default "forexConversion" rule identified for the EXPENSE archetype in transaction archetype definition 300. For transactions referencing transaction object 310A that are conducted in a currency that is different from a default currency, the transactions are converted to the default currency not at the spot rate, but at the average rate over the trailing 90 days. Thus, the amount specified in the transaction may be converted using this average rate, and the converted amount may be included in the credit and debit transactions discussed above.

Transaction object 310B, however, represents a transaction in which a default data store specified in a transaction archetype definition is overridden by a data store specified in the transaction object 310B. In this example, a system that receives transaction object 310B may generate a write request against the default credit account for the EXPENSE archetype, as discussed above with respect to transaction object 310A. However, as illustrated, transaction object 310B includes an override to the debit account to which a corresponding debit transaction is to be written. Thus, rather than writing a debit transaction to the "assets" account defined as the default debit account in transaction archetype definition 300, a system that processes a request to record a transaction represented by transaction object 310B may write a debit transaction to the "hourlyPay" account to decrease the valance of the "hourlyPay" account by the amount specified in transaction object 310B.

Example Operations for Processing Transactions Based on Transaction Archetypes

Figure 4:
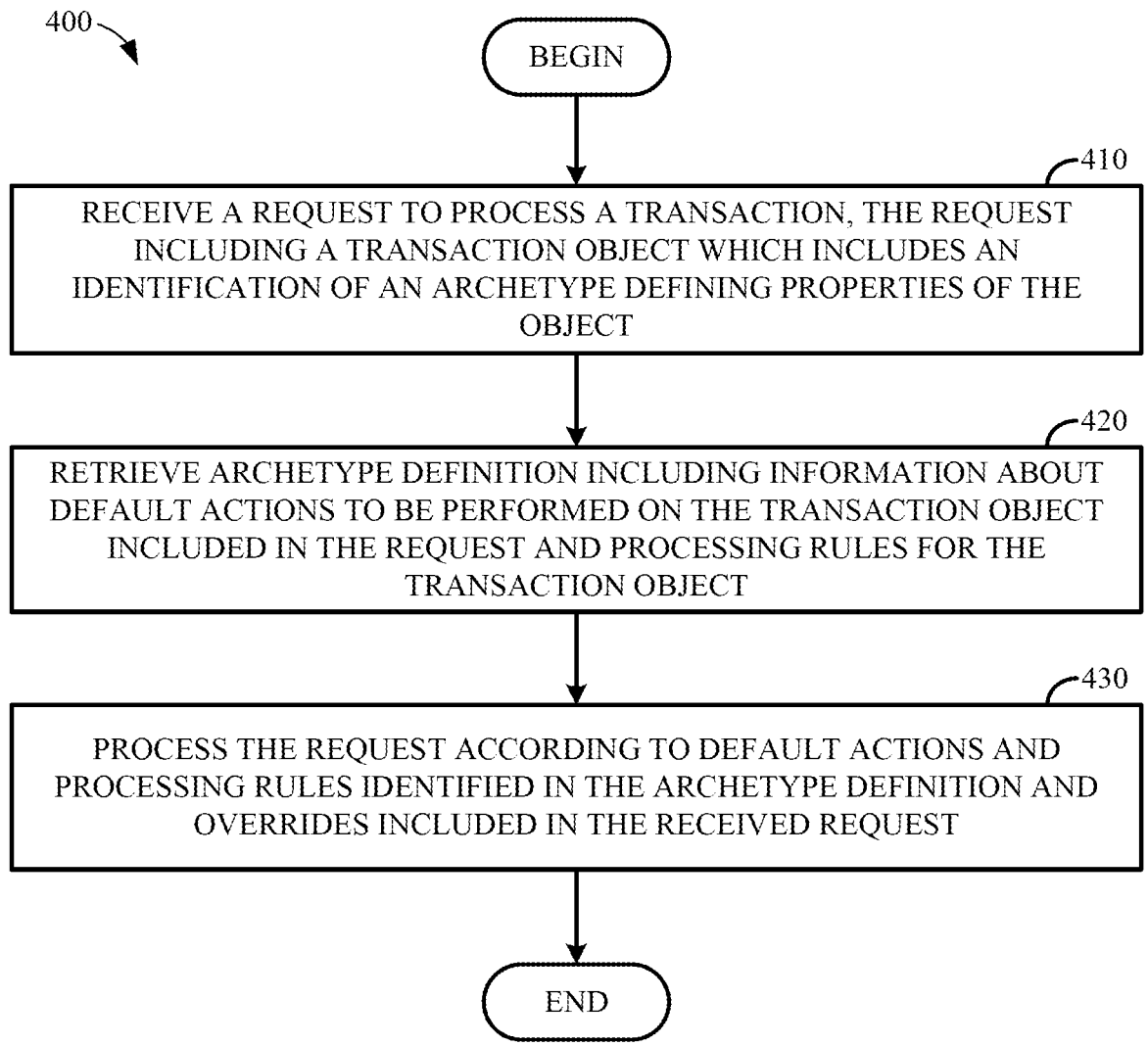
FIG. 4 illustrates example operations for processing transactions and committing transaction records to one or more data repositories based on transaction archetypes.

FIG. 4 illustrates example operations that may be performed by a system (e.g., transaction processing engine 120 illustrated in FIGS. 1 and 2) to process transactions based on transaction archetypes.

As illustrated, operations 400 begin at 410, where a system receives a request to process a transaction. The transaction generally includes a transaction object which includes an identification of an archetype that defines properties of the object. As discussed, the system can receive the request to process a transaction synchronously from an instance of an application executing on a server or a client device (e.g., through an application programming interface (API) call, a Representation State Transfer (REST) request, etc.) or asynchronously from a queue of messages placed on a message bus by the application instances. The transaction archetype may be one of a plurality of archetypes defined in a system configuration that defines default rules for processing a request including the transaction object.

At 420, the system retrieves an archetype definition for use in processing the request. The archetype definition may include information about default actions to be performed on the transaction object included in the request and processing rules for the transaction object. For example, as discussed above, an archetype definition in an accounting system may define different types of transactions and the associated debit and credit accounts (i.e., data stores) to which offsetting transaction records are to be recorded.

At 430, the system processes the object according to default actions and processing rules identified in the archetype definition and overrides included in the received request. Generally, processing the object may include identifying one or more data repositories against which transaction records are to be written and writing transaction records to the identified data repositories. The system can process the object by generating a first transaction record to be committed to a first data store and a second transaction record to be committed to a second data store, and the first and second transaction records may offset when combined so that no net change is recorded in a transaction processing system. The overrides may be specified within a transaction object included in the received request and/or in the request itself. If no overrides are included in the received request, the system can process the transaction according to the default processing rules and default actions. Otherwise, where an override is specified for a specific action or processing rule, the specified override for the action or processing rules can be performed instead of the corresponding default action or processing rule specified in the archetype definition. Where an override is not specified for a specific action or processing rule, the default action or processing rule included in the archetype definition may be performed.

In one example, the archetype may identify a default first data store and a default second data store. The request may specify at least one of an override first data store to the default first data store or an override second data store to the default second data store. To write a generated record for the processed transaction object, the default first data store may be selected as the first data store where the request does not include the override first data store. The override first data store may be selected where the request includes the override first data store. The default second data store may be selected as the second data store where the request does not include the override second data store. Finally, the override second data store may be selected as the second data store where the request includes the override second data store.

The transaction object may include a plurality of items. Each respective item of the plurality of items may be associated with a tag specifying rules for processing the respective item. Records may be generated for each respective item in the transaction object. To do so, a system can identify, from the rules for processing the respective item, default repositories against which records for the respective item are to be committed, and the generated records may be written to the identified default repositories associated with the respective item. Each item in the transaction object may be processed by identifying, for the respective item, rules for processing the respective item that conflict with default rules defined for the referenced transaction archetype. The respective item may be processed using the identified rules instead of the conflicting default rules, and non-conflicting rules defined for the referenced transaction archetype.

The system may further receive a request to generate a report of transactions associated with the transaction archetype. The system can query the default data repositories and the overriding data repositories for a set of transactions associated with the transaction archetype according to one or more parameters in the request to generate the report of transactions. The set of transactions associated with the transaction archetype retrieved from the default data repositories and the overriding data repositories may be output for further analysis. For example, the set of transactions may be exported to a structured or unstructured document which may be saved on a client device or remote storage for future retrieval. In another example, the set of transactions may be exported to an analysis system that can analyze the transactions and generate graphical reports depicting information about the set of transactions associated with the transaction archetype.

Figure 5:
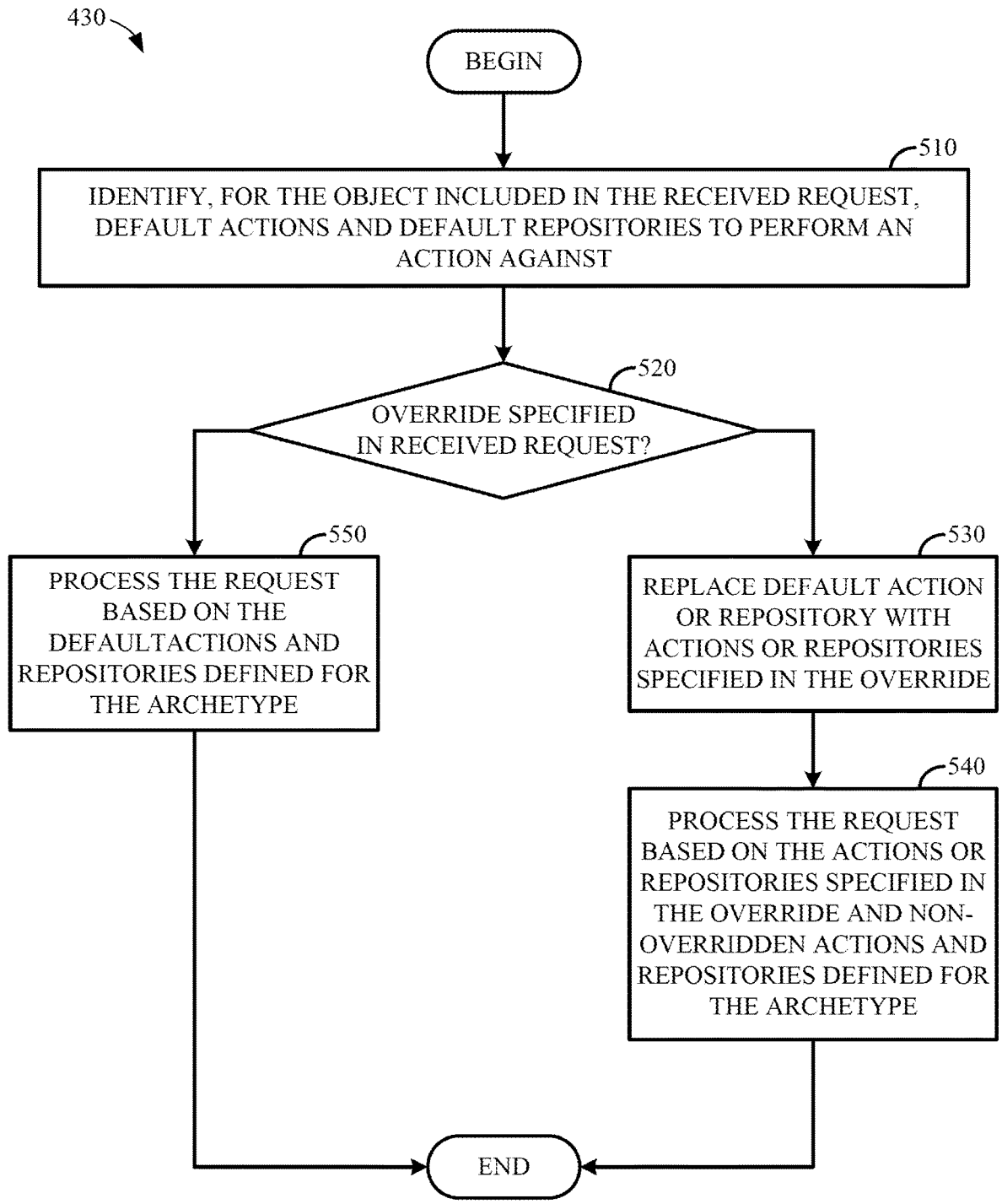
FIG. 5 illustrates example operations for processing transactions and committing transaction records to one or more data repositories based on transaction archetypes and override information included in a request to process a transaction.

FIG. 5 illustrates further details of example operations 430 illustrated in FIG. 4 that may be performed to process an object according to default actions and processing rules identified in the archetype definition and overrides included in the received request.

As illustrated, operations 430 may begin at block 510, where the system identifies, for the object included in the received request, default actions and default repositories to perform an action against. As discussed, the system can identify these default actions and default repositories based on the definitions of different transaction archetypes defined for the system. The system can identify the default actions and default repositories for an object included in a transaction by searching the configuration information for information associated with the archetype identified in the object. The configuration information may be structured according to a markup language schema. For example, the configuration information may be structured using tag-value pairs and tab level information, according to an XML, schema, or the like.

At block 520, the system determines whether an override is included in the received request. To determine if an override is included in the received request, the system can examine a definition of the transaction object included in a request to determine whether the transaction object is defined with information identifying an override to a default action or repository identified in the archetype definition. The system can also examine the contents of the received request to determine if any overrides are included in the received request.

If, at block 520, the system determines that an override is included in the received request, then at block 530, the system replaces a default action or repository with an action or repository specified as an override in the request.

At block 540, the system processes the request based on the actions or repositories specified as an override in the request and the non-overridden actions or repositories defined for the archetype If, however, at block 520, the system determines that no overrides are included in the received request, the system may proceed to block 550. At block 550, the system can process the request based on the default actions and default repositories included in the archetype definition.

Figure 6:
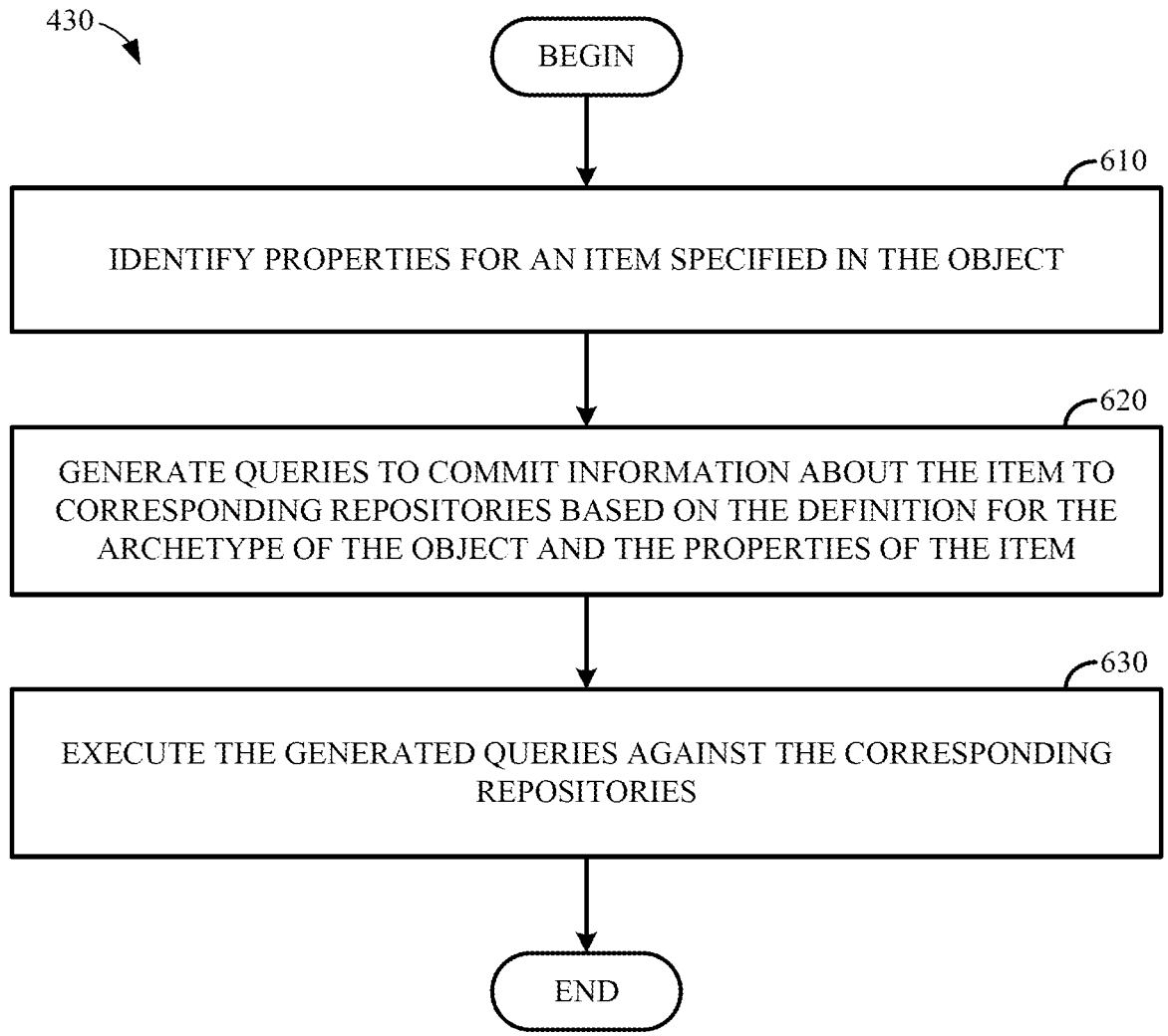
FIG. 6 illustrates example operations for processing transactions and committing transaction records to one or more data repositories based on transaction archetypes on individual items included in a transaction object.

FIG. 6 illustrates further details of example operations 430 illustrated in FIG. 4 that may be performed to process an object on an item-by-item basis. For example, in an accounting application, an invoice object may be processed with each line item of the invoice object being its own item processed independently of other items included in the invoice object. For example, each line item may reference an archetype that identifies a default line item debit account and a default line item credit account associated with a default line item debit record repository and a default line item credit record repository, respectively, and a label associated with a line item of the invoice object may specify an override line item debit account and/or an override line item credit account associated with an override line item debit repository and an override line item credit repository, respectively.

As illustrated, operations 430 begin at block 610, where the system identifies properties for an item specified in the object. Each item may be associated with a tag or a label identifying the item. In such a case, each item may be its own object that may be processed independently according to the default definition of the archetype referenced by an item and any overrides to the default definition of the archetype.

At block 620, the system generates queries to commit information about the item to corresponding repositories based on the definition for the archetype of the object and the properties of the item. As discussed, the properties of an item may specify actions to perform with respect to the item prior to committing transaction records for the item to one or more data repositories. The properties of the item may additionally specify default repositories against which transaction records are to be stored. Generally, when an item definition includes a specification of an action or data repository against which a transaction is to be stored that conflicts with corresponding information in the archetype of the object, the action or data repository specified for the item may be used instead of the default action or data repository specified in the archetype of the object.

In some embodiments, generating the queries to commit information about the item to the corresponding repositories may include performing one or more pre-processing actions on the data associated with one or more items in the transaction object. The pre-processing actions may be defined in the archetype definition, in a definition of a specific item in an object for which a record is to be generated, or in the request to record a transaction. In some embodiments, generating a query may include generating a first query to retrieve some relevant data from a data store and use the retrieved data and the data included in the object to generate a result. The result may be committed to one or more data repositories according to the data repositories specified in an archetype of the definition of the specific item.

For example, suppose that a transaction object includes multiple line items denominated in a first currency and transactions are defined (e.g., in an archetype) as being recorded in a second currency. The system can retrieve a conversion rate from an outside data source, convert the values in the transaction item from the first currency to the second currency, and generate one or more transaction records using the values converted to the second currency. In another example, a system may be configured (e.g., according to rules defined in a transaction archetype or a type of item included in a transaction object) to identify inventory items to associate with a sales transaction. The system can retrieve, from a first data repository, identifiers of objects to associate with a transaction according to the configuration. For example, in a sales transaction, the system may be configured to identify the oldest items in an inventory data repository to match with the items included in an invoice transaction object, and the system can generate transaction records including identifiers of the oldest items in the inventory data repository and other information derived from information about the identified oldest items.

At block 630, the system executes the generated queries against the corresponding repositories.

Example Systems for Processing Transactions Based on Transaction Archetypes

Figure 7:
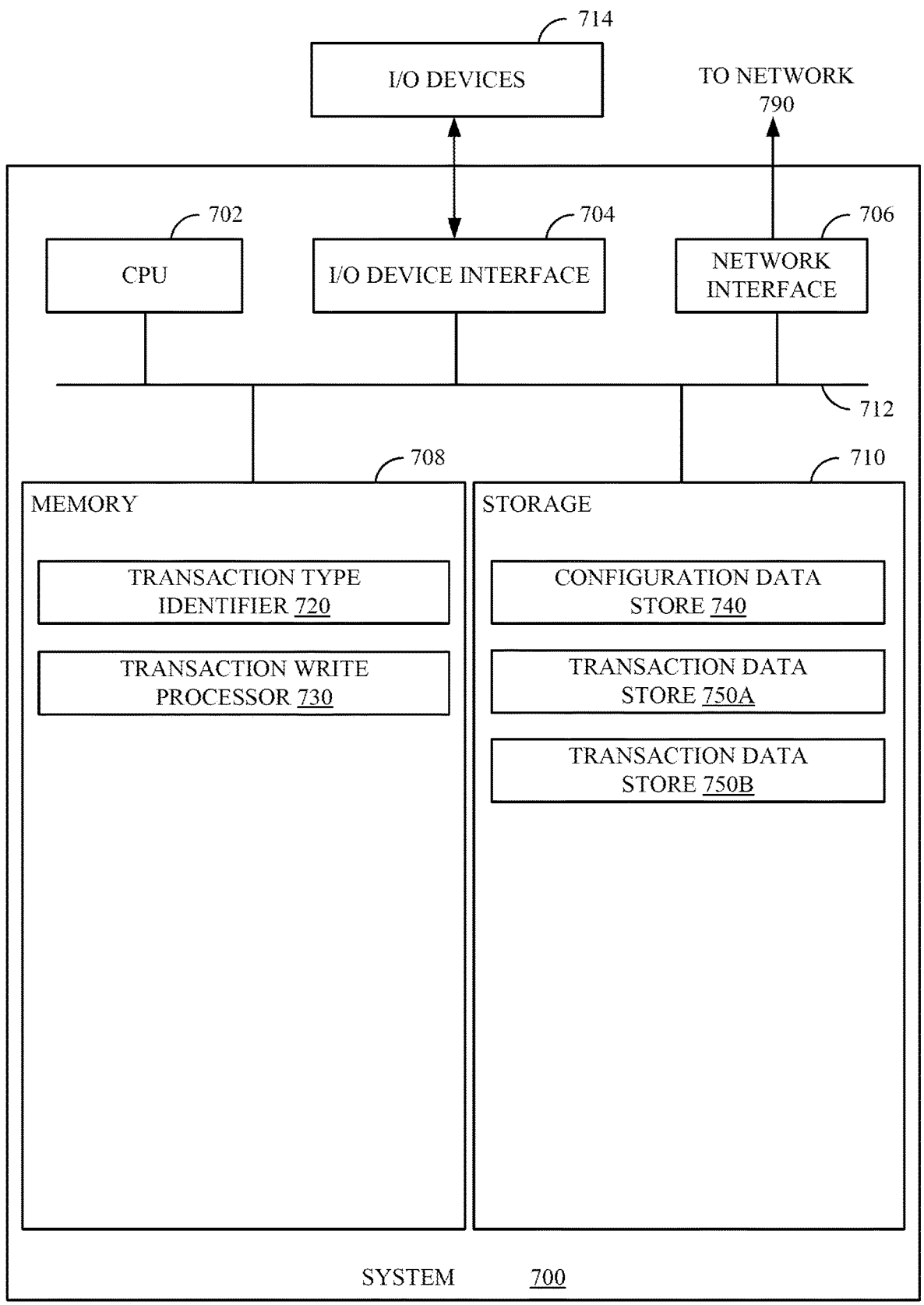
FIG. 7 illustrates an example computing system with which embodiments of the present disclosure may be implemented.

FIG. 7 illustrates an example system 700 that processes transactions using transaction archetypes defined for an application executing on system 700.

As shown, system 700 includes a central processing unit (CPU) 702, one or more I/O device interfaces 704 that may allow for the connection of various I/O devices 714 (e.g., keyboards, displays, mouse devices, pen input, etc.) to the system 700, network interface 706 through which system 700 is connected to network 790 (which may be a local network, an intranet, the internet, or any other group of computing devices communicatively connected to each other), a memory 708, storage 710, and an interconnect 712.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 706, memory 708, and storage 710.

CPU 702 is included to be representative of a single CPU, multiple CPUs, a single CPU having multiple processing cores, and the like.

Memory 708 is representative of a volatile memory, such as a random access memory, or a nonvolatile memory, such as nonvolatile random access memory, phase change random access memory, or the like. As shown, memory 708 includes a transaction type identifier 720 and a transaction write processor 730. Transaction type identifier 720 generally retrieves information, from a configuration repository, about a transaction archetype associated with a transaction in an incoming request to record a transaction in one or more data repositories (e.g., transaction data stores 750A and 750B in system 700, or a remote data repository). To do so, transaction type identifier 720 can parse out information in a received request to identify the name of an archetype included in a request or the transaction object included in a request. Based on the identified name, transaction type identifier 720 can retrieve an archetype definition, which includes default actions and repositories against which a transaction record is to be written.

In some embodiments, where system 700 receives transactions as domain-specific objects for processing from a generator application, transaction type identifier 720 can translate the domain-specific objects into archetype-based objects according to mappings defined for the domain-specific objects. These mappings generally may be defined a priori to identify how domain-specific fields in a domain-specific object can be mapped to corresponding fields in an archetype-based object. These mappings may be updated as the domain-specific object changes (e.g., as elements in the domain-specific object are deprecated or added). As discussed, by translating domain-specific objects into archetype-based objects at a transaction processing system (e.g., system 700), a single code base may be maintained to generate archetype-based objects that can be used by a plurality of consumer applications, and consumer applications need not be updated to handle changes to existing domain-specific objects or the introduction of new domain-specific objects from new generator applications.

Transaction write processor 730 generally uses the default actions and data repositories, as well as override information included in the transaction object to write one or more transaction records to one or more data repositories. Generally, if a received request or a transaction object included in a received request does not include any overrides, the default actions and repositories may be used in processing the request. Otherwise, overrides in the received request or transaction object may be used in lieu of a corresponding default action or repository, and default actions or repositories may be used where no override is specified in the received request or transaction object. In some embodiments, transaction write processor 730 can publish objects to a message bus (e.g., via network connection 706). The objects published to the message bus may be archetype-based objects that can be consumed and processed by a variety of consumer application instances using standard code for handling archetype-based objects rather than custom code for handling domain-specific objects.

Storage 710 is representative of a non-volatile memory, such as a disk drive, solid state drive, or a collection of storage devices distributed across multiple storage systems. Although shown as a single unit, the storage 710 may be a combination of fixed and/or removable storage devices, such as fixed disc drives, removable memory cards or optical storage, network attached storage (NAS), or a storage area-network (SAN). Storage 710, as illustrated, may include a configuration data store 740 and one or more transaction data stores 750. Configuration data store 740 generally includes information defining transaction archetypes and transaction objects that reference one of the defined transaction archetypes. The transaction data stores 750 generally represent one or more data repositories in which transaction records may be written. A transaction data store 750A may be used to record a first part of a transaction, and a transaction data store 750B may be used to record a second part of the transaction, where the first and second parts of the transaction offset.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for processing transactions in a computing system, comprising:
   receiving, from one of a plurality of software applications, a request to perform an operation through a service implemented using a unitary code base with respect to a transaction object included in the request, wherein the transaction object references a transaction archetype and is formatted in a domain-specific format associated with the one of the plurality of software applications;
   retrieving a schema defining the transaction archetype, the schema defining default data repositories against which platform-agnostic records generated from the transaction object are to be committed and default rules for generating the platform-agnostic records from data included in the transaction object, wherein the default data repositories comprise a first default repository for a platform-agnostic record for the transaction object and a second default repository for a corresponding record for the transaction object;
   identifying, based on the default rules, the default data repositories, overriding rules defined in the transaction object, and overriding data repositories defined in the transaction object, a set of rules to use to generate the platform-agnostic records and a set of data repositories to which the platform-agnostic records are to be committed;
   generating, using the unitary code base, platform-agnostic records for the transaction object based on transaction data included in the transaction object and the set of rules; and
   writing the generated platform-agnostic records for the transaction object to the set of data repositories.

2. The method of claim 1, wherein generating the platform-agnostic records for the transaction object comprises generating a first transaction record to be committed to a first data store and generating a second transaction record to be committed to a second data store, wherein the first and the second transaction records, when combined, offset such that no net change is recorded in a transaction processing system.

3. The method of claim 2, wherein:
   the transaction archetype identifies a default first data store and a default second data store,
   the request specifies at least one of an override first data store to the default first data store or an override second data store to the default second data store, and
   writing the generated platform-agnostic records for the transaction object comprises:
      selecting the default first data store as the first data store where the request does not include the override first data store;
      selecting the override first data store as the first data store where the request includes the override first data store;
      selecting the default second data store as the second data store where the request does not include the override second data store; and
      selecting the override second data store as the second data store where the request includes the override second data store.

4. The method of claim 1, wherein:
   identifying the set of rules to use to generate the platform-agnostic records and the set of data repositories to which the platform-agnostic records are to be committed comprises: for each respective item in the transaction object, identifying, from the rules for processing the respective item and repositories against which records for the respective item are to be committed; and
   writing the generated platform-agnostic records for the transaction object comprises: committing the generated records to the identified repositories against which records for the respective item are to be committed.

5. The method of claim 1, wherein generating the platform-agnostic records for the transaction object comprises:
   identifying, for each respective item in the transaction object, rules for processing the respective item that conflict with default rules defined for the transaction archetype; and
   processing the respective item using the identified rules instead of conflicting default rules, and non-conflicting rules defined for the transaction archetype.

6. The method of claim 1, further comprising:
   receiving a request to generate a report of transactions associated with the transaction archetype;
   querying the default data repositories and the overriding data repositories for a set of platform-agnostic records for transactions associated with the transaction archetype according to one or more parameters in the request to generate the report of transactions; and
   outputting the set of platform-agnostic records for the transactions associated with the transaction archetype retrieved from the default data repositories and the overriding data repositories.

7. The method of claim 1, further comprising identifying the overriding repositories based on semantic analysis of one or more strings included in the transaction object.

8. A system, comprising:
   a memory having executable instructions stored thereon; and
   a processor configured to execute the executable instructions to cause the system to:
      receive, from one of a plurality of software applications, a request to perform an operation through a service implemented using a unitary code base with respect to a transaction object included in the request, wherein the transaction object references a transaction archetype and is formatted in a domain-specific format associated with the one of the plurality of software applications,
      retrieve a schema defining the transaction archetype, wherein the schema defines default data repositories against which platform-agnostic records generated from the transaction object are to be committed and default rules for generating the platform-agnostic records from data included in the transaction object, wherein the default data repositories comprise a first default repository for a platform-agnostic record for the transaction object and a second default repository for a corresponding record for the transaction object,
      identify, based on the default rules, the default data repositories, overriding rules defined in the transaction object, and overriding data repositories defined in the transaction object, a set of rules to use to generate the platform-agnostic records and a set of data repositories to which the platform-agnostic records are to be committed, generate, using the unitary code base, platform-agnostic records for the transaction object based on transaction data included in the transaction object and the set of rules, and write the generated platform-agnostic records for the transaction object to the set of data repositories.

9. The system of claim 8, wherein in order to generate the platform-agnostic records for the transaction object, the processor is configured to cause the system to generate a first transaction record to be committed to a first data store and generating a second transaction record to be committed to a second data store, wherein the first and the second transaction records, when combined, offset such that no net change is recorded in the system.

10. The system of claim 9, wherein:
the transaction archetype identifies a default first data store and a default second data store,
the request specifies at least one of an override first data store to the default first data store or an override second data store to the default second data store, and
in order to write the generated platform-agnostic records for the transaction object, the processor is configured to cause the system to:
select the default first data store as the first data store where the request does not include the override first data store,
select the override first data store as the first data store where the request includes the override first data store,
select the default second data store as the second data store where the request does not include the override second data store, and
select the override second data store as the second data store where the request includes the override second data store.

11. The system of claim 8, wherein:
in order to identify the set of rules to use to generate the platform-agnostic records and the set of data repositories to which the platform-agnostic records are to be committed, the processor is configured to cause the system to, for each respective item in the transaction object, identify, rules for processing the respective item and repositories against which records for the respective item are to be committed; and
in order to write the generated platform-agnostic records for the transaction object comprises, the processor is configured to commit the generated records to the identified repositories against which records for the respective item are to be committed.

12. The system of claim 8, wherein in order to generate the platform-agnostic records for the transaction object, the processor is configured to cause the system to:
identify, for each respective item in the transaction object, rules for processing the respective item that conflict with default rules defined for the transaction archetype; and
process the respective item using the identified rules instead of conflicting default rules, and non-conflicting rules defined for the transaction archetype.

13. The system of claim 8, wherein the processor is further configured to cause the system to:

receive a request to generate a report of transactions associated with the transaction archetype;
query the default data repositories and the overriding data repositories for a set of platform-agnostic records for transactions associated with the transaction archetype according to one or more parameters in the request to generate the report of transactions; and
output the set of platform-agnostic records for the transactions associated with the transaction archetype retrieved from the default data repositories and the overriding data repositories.

14. The system of claim 8, wherein the processor is further configured to cause the system to identify the overriding repositories based on semantic analysis of one or more strings included in the transaction object.

15. A method for processing transactions in a computing system, comprising:
receiving, from one of a plurality of software applications, a request to record a transaction in an electronic transaction ledger through a service implemented using a unitary code base;
retrieving a schema defining a transaction archetype associated with the transaction;
parsing the schema defining the transaction archetype to identify a default debit record repository against which a debit record for the transaction is to be committed, a default credit record repository against which a credit record for the transaction is to be committed, and default rules for processing the transaction, wherein the debit record and the credit record comprise corresponding records to be committed to one or more data repositories; and
identifying, from information included in the request to record the transaction, one or more of an overriding credit record repository, an overriding debit record repository, or overriding rules for processing the transaction;
identifying, based on the default rules, the default debit record repository, the default credit record repository, the overriding rules, the overriding debit record repository, and the overriding credit record repository, a set of rules to use to generate the debit record and the credit record and a set of data repositories to which the debit record and the credit record are to be committed;
generating using the unitary code base, the debit record for the transaction and the credit record for the transaction based on transaction data included in the request to record the transaction and the set of rules;
writing the debit record to a designated debit record repository in the set of data repositories; and
writing the credit record to a designated credit record repository in the set of data repositories.

16. The method of claim 15, wherein:
generating the debit record for the transaction and the credit record for the transaction comprises: for each respective item in the transaction, identifying, from the set of data repositories, a default line item debit record repository and a default line item credit record repository associated with a tag associated with the respective item;
writing the debit record comprises committing the debit record to the default line item debit record repository; and
writing the credit record comprises committing the credit record to the default line item credit record repository.

17. The method of claim 15, wherein generating the debit record for the transaction and the credit record for the transaction comprises:
- identifying, for each respective item in the transaction, rules for processing the respective item that conflict with default rules defined for the transaction archetype; and
- processing the respective item using the identified rules instead of conflicting default rules, and non-conflicting rules defined for the transaction archetype.

18. The method of claim 15, further comprising:
- receiving a request to generate a report of transactions associated with the transaction archetype;
- querying the default debit record repository, default credit record repository, overriding debit record repository, and overriding credit record repository for a set of transactions associated with the transaction archetype according to one or more parameters in the request to generate the report of transactions; and
- outputting the set of transactions associated with the transaction archetype retrieved from the default debit record repository, default credit record repository, overriding debit record repository, and overriding credit record repository.

19. The method of claim 15, further comprising semantically determining the default debit record repository and the default credit record repository based on a semantic closeness of data repositories identified in the schema defining the transaction archetype and names of data repositories maintained for a user of the electronic transaction ledger.

20. The method of claim 15, further comprising the overriding repositories based on semantic analysis of one or more strings included in the transaction.

* * * * *